US011143334B2

United States Patent
O'Neill et al.

(10) Patent No.: US 11,143,334 B2
(45) Date of Patent: Oct. 12, 2021

(54) ESCUTCHEON

(71) Applicant: Accor Technology, Inc., Kirkland, WA (US)

(72) Inventors: Jerry Edward O'Neill, Kirkland, WA (US); Charlie E. Whitney, Jr., East Wenatchee, WA (US)

(73) Assignee: Accor Technology, Inc., Kirkland, WA (US)

( * ) Notice: Subject to any disclaimer, the term of this patent is extended or adjusted under 35 U.S.C. 154(b) by 70 days.

(21) Appl. No.: 16/588,629

(22) Filed: Sep. 30, 2019

(65) Prior Publication Data
US 2021/0095792 A1 Apr. 1, 2021

(51) Int. Cl.
*E03C 1/02* (2006.01)
*F16L 5/02* (2006.01)

(52) U.S. Cl.
CPC ............. *F16L 5/02* (2013.01); *E03C 1/021* (2013.01); *E03C 2201/50* (2013.01); *Y10T 137/6977* (2015.04)

(58) Field of Classification Search
CPC ........ E03C 1/021; E03C 2201/50; F16L 5/00; F16L 5/10; F16L 37/091; Y10T 137/6977
See application file for complete search history.

(56) References Cited

U.S. PATENT DOCUMENTS

| | | | |
|---|---|---|---|
| 3,615,108 A | 10/1971 | Toth | |
| 3,633,944 A * | 1/1972 | Hamburg | F16L 17/035 285/81 |
| 3,823,964 A * | 7/1974 | Politz | F16L 5/00 285/46 |
| 3,924,882 A * | 12/1975 | Ellis | F16L 37/148 285/148.19 |
| 4,385,777 A * | 5/1983 | Logsdon | F16L 5/10 16/2.1 |
| 5,236,229 A * | 8/1993 | Gonzalez | F16L 5/10 137/359 |
| 5,243,153 A | 9/1993 | Holwerda | |
| 5,447,338 A | 9/1995 | Kikuchi | |
| 6,378,912 B1 | 4/2002 | Condon et al. | |
| 6,419,276 B1 | 7/2002 | Gatter et al. | |
| 6,533,041 B1 | 3/2003 | Jensen | |
| 6,666,227 B2 * | 12/2003 | Erickson | E03C 1/042 137/270 |
| 6,807,983 B1 | 10/2004 | Erickson | |
| 6,845,785 B1 | 1/2005 | Condon | |

(Continued)

*Primary Examiner* — Kevin F Murphy
(74) *Attorney, Agent, or Firm* — George C. Rondeau, Jr.; Davis Wright Tremaine, LLP

(57) ABSTRACT

An escutcheon mountable on a pipe having compression ferrule thereon, having a body with an annular body wall and an inner body sidewall portion defining a body opening, and an insert having an annular insert wall portion, an outer insert sidewall portion extending about the annular insert wall portion and sized to fit within the central body opening with the outer insert sidewall portion, and a plurality of inwardly extending members. The members being resiliently bendable between a first position with the inward free-end portions being in gripping contact with the pipe and a second position with the inward free-end portions defining a central insert opening sized to permit the insert to pass by the ferrule on the pipe as the escutcheon is pressed onto the pipe and then return to the first position.

35 Claims, 12 Drawing Sheets

(56) References Cited

U.S. PATENT DOCUMENTS

| | | | |
|---|---|---|---|
| 6,948,518 B1 | 9/2005 | Ball | |
| 7,197,777 B2 * | 4/2007 | Ismert | E03C 1/042 |
| | | | 4/252.1 |
| 7,287,474 B2 | 10/2007 | Whitley | |
| 9,863,557 B2 * | 1/2018 | Haynes | H02G 3/22 |
| 2008/0211226 A1 | 9/2008 | Whitney | |

* cited by examiner

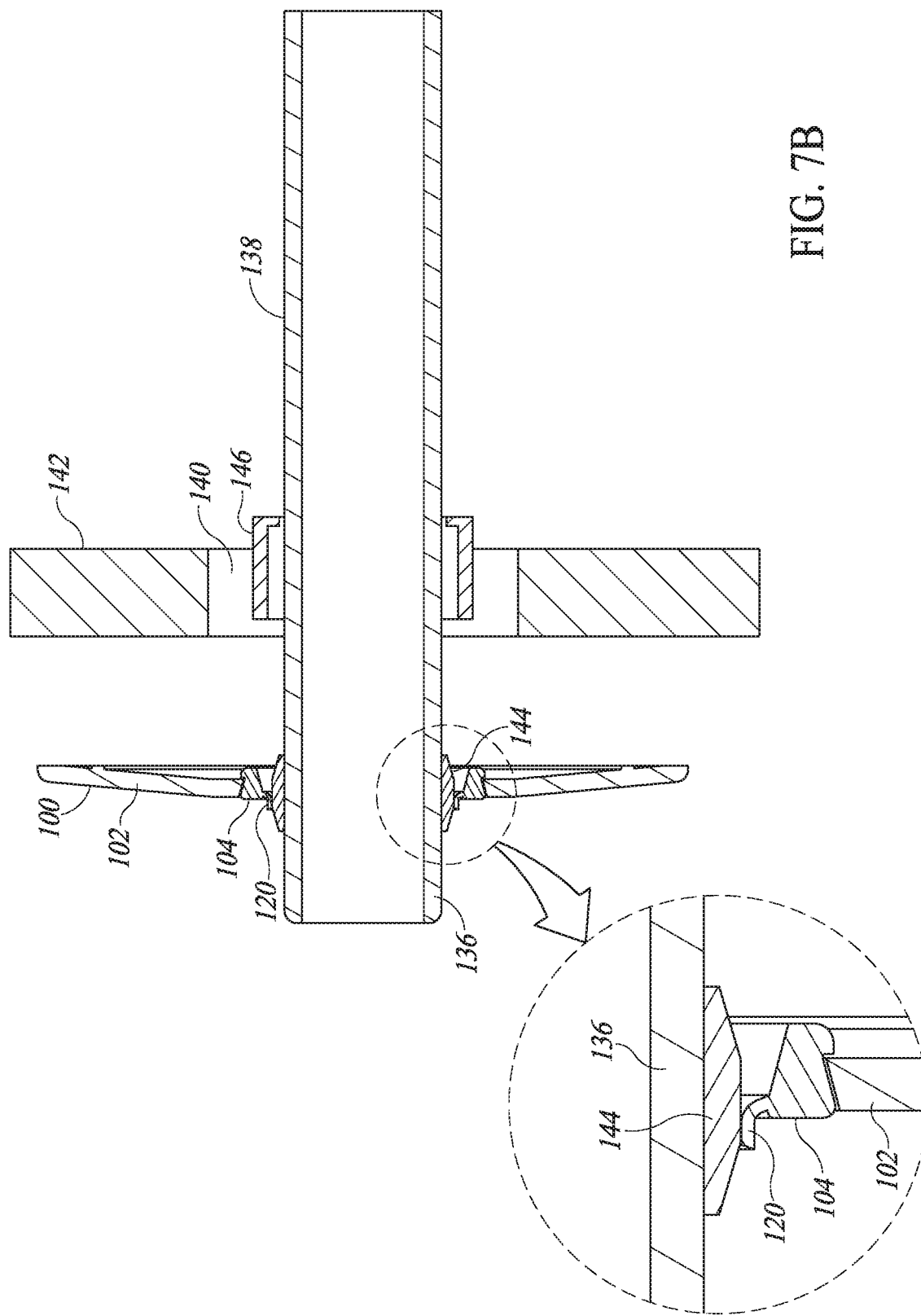

ESCUTCHEON

FIELD OF THE INVENTION

This invention is related to plumbing hardware, in particular escutcheons.

BACKGROUND OF THE INVENTION

Pipes such as those coupled to sinks and other fixtures can be located inside of internal walls of residential and commercial buildings. To be coupled with fixtures located outside of the walls, oftentimes a pipe will extend through a hole in the wall that houses the pipe. The hole in the wall can typically be unsightly so that a conventional escutcheon (cover plate) is used to cover the hole. The escutcheon typically has an opening sized large enough for the pipe to extend through it but small enough so that the hole in the wall is sufficiently covered, i.e., the gap between the pipe and the escutcheon is very small and the escutcheon spans over the hole and beyond the perimeter of the hole such that the hole is virtually invisible to the naked eye.

A compression plumbing fitting, such as a stop valve, can be coupled to the pipe using a compression ring typically made of brass, also known as a compression ferrule, and a nut which is positioned on the pipe inward of the compression ferrule (i.e., between the compression ferrule and the escutcheon at wall with the hole through which the pipe extends outward), as is conventionally known. Typically, the escutcheon is first slid onto the pipe and positioned against the wall. Then, the nut is slid onto the pipe followed by the compression ferrule. Finally, the compression valve is slid onto the pipe and the compression ferrule is moved into position inside a rearward open-end portion of the compression valve. The nut is then screwed tightly onto an exteriorly threaded portion of the rearward end portion of the compression valve. This typically results in squeezing the compression ferrule inward on the pipe with sufficient force that removing the compression ferrule later, such as to replace the compression valve, is difficult if not impossible, or at least requires use of a special puller tool. Further, if the compression ferrule is not removed, a replacement compression valve must be attached using the same compression ferrule, nut and escutcheon. However, using the old compression ferrule and nut with a new compression valve may result in leaks or void the warranty for the new compression valve.

A problem can occur when it is desired to use a push-fit valve to replace the compression valve on the pipe even if there is sufficient pipe outward of the compression ferrule for the gripper rings of the push-fit valve to grip the portion of the pipe outward of the compression ferrule and the push-fit valve is constructed with a rearward end portion having a rearward opening sufficiently large to slid over the compression ferrule. The problem is how to install a new replacement escutcheon having a central hole through which the pipe must extend which is sized to minimize the gap between it and the pipe so as to provide an improved appearance, and which is smaller in diameter than the compression ferrule.

One undesirable alternative is to cut off the portion of the pipe at the inward end of the compression ferrule, but this might leave too little pipe available for attachment of the replacement push-fit valve. Another undesirable alternative is to remove the compression ferrule with the aid of a pulling too, but this can be difficult and requires extra installation steps, effort and a tool. The compression of the pipe caused by the compression of the compression ferrule, which remains after the compression ferrule is removed, may also impact the seal with the pipe achievable with the replacement push-fit valve.

BRIEF DESCRIPTION OF THE SEVERAL VIEWS OF THE DRAWING(S)

FIG. 7B is a side elevational view of the escutcheon mounted on the pipe shown in FIG. 7A with a portion of the escutcheon shown enlarged.

DETAILED DESCRIPTION OF THE INVENTION

Figure 1A:
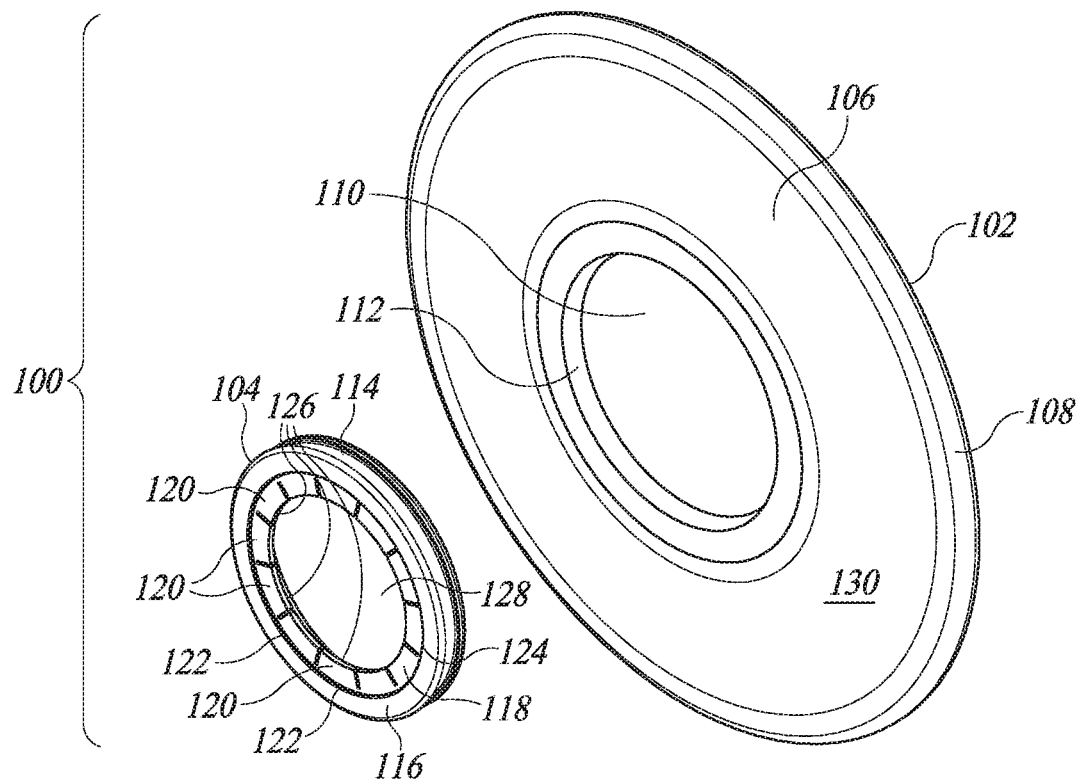
FIG. 1A is a front perspective, exploded view of an escutcheon.
Figure 1B:
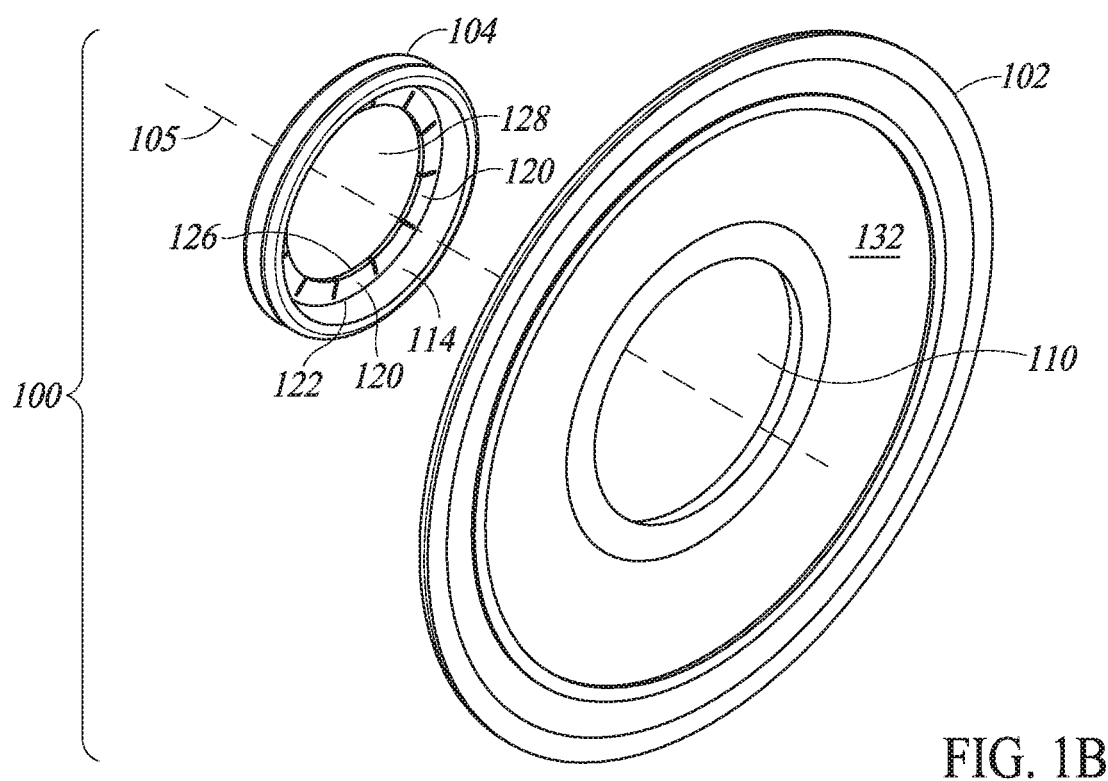
FIG. 1B is a rear perspective, exploded view of the escutcheon of FIG. 1A.

A cover plate or escutcheon 100 is depicted in FIG. 1 as having a body 102 and a pipe gripping member or insert 104. The body 102 and insert 104 are joined together when fully installed. The body and insert 104 are illustrated separated in FIGS. 1A and 1B, and shown joined together in FIGS. 2A, 2B, 3A, 3B, and 3C. The two-part construction for the escutcheon 100 allows the body 102 to be manufactured of an ABS plastic and chrome plated to provide a conventional chrome appearance for escutcheons, while the insert 104 is manufactured of polyethylene which provides for the flexibility and resiliency required, which will be described below.

Figure 6A:
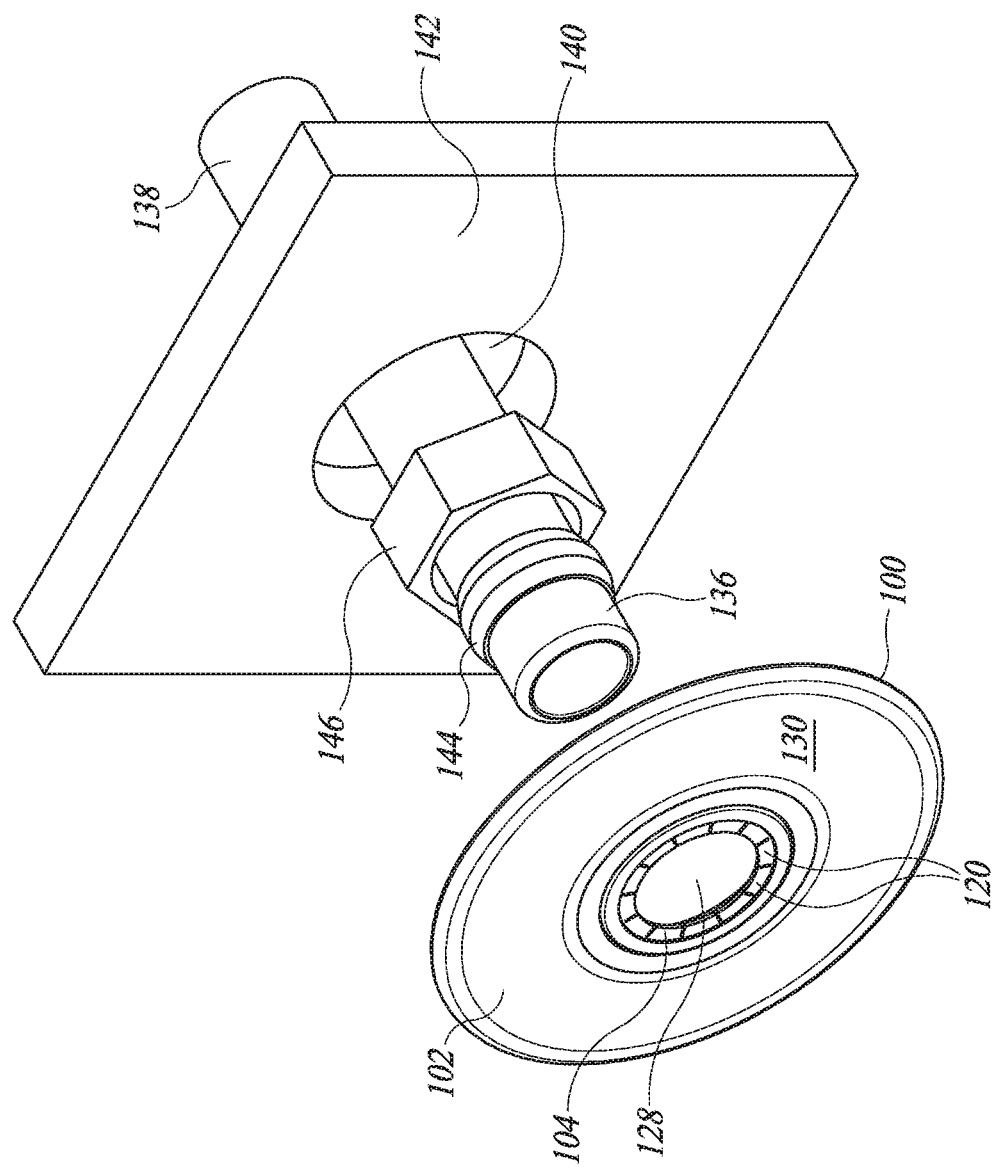
FIG. 6A is an exploded perspective view of the escutcheon positioned for mounting on the pipe shown in FIG. 4.
Figure 6B:
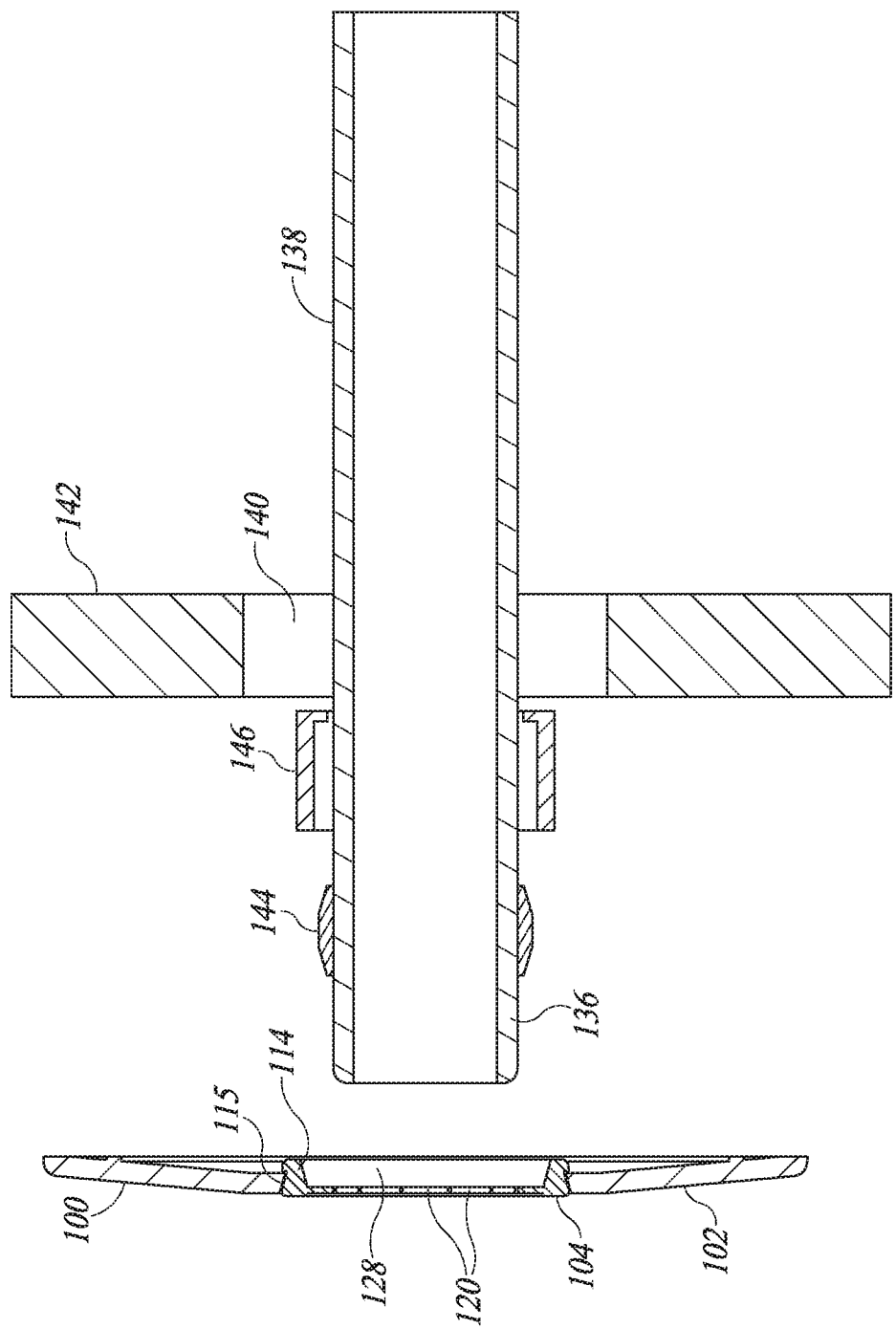
FIG. 6B is a side elevational view of the escutcheon positioned for mounting on the pipe shown in FIG. 6A.

The body 102 has an annular body face wall portion 106 with an outer perimeter edge portion 108 and a central body opening 110 defined by an inner body sidewall portion 112. The insert 104 has an outer insert sidewall portion 114 extending circumferentially about the outer perimeter of a rigid annular insert face wall portion 116 (about a longitudinal insert axis 105 of the insert, as shown in FIG. 1B) and sized to fit within the central body opening 110 with the insert sidewall portion in face-to-face juxtaposition with the inner body sidewall portion 112. As best shown in FIG. 6B, the outer insert sidewall portion 114 has a circumferentially extending, perimeter groove 115 and the inner body sidewall portion 112 is shaped to fit within the insert perimeter groove, such that the insert 104 may be snap fit into the central body opening 110 and be securely held in place therein.

In the illustrated embodiment the outer insert sidewall portion 114 and the inner body sidewall portion 112 are releasably connected together when the outer insert sidewall portion is within the central body opening 110 in face-to-face juxtaposition with the inner body sidewall portion. In an alternative embodiment, the outer insert sidewall portion 114 and the inner body sidewall portion 112 may be fixedly connected together when the outer insert sidewall portion is within the central body opening 110.

The insert 104 further includes an inner insert annular portion 118 position laterally inward of the insert face wall portion 116, with both extending transverse to the insert axis 105 (in the illustrated embodiment extending orthogonal to the insert axis and the outer insert sidewall portion 114). In the illustrated embodiment the insert face wall portion 116 and the insert annular portion 118 are in a coplanar arrangement. The insert annular portion 118 includes a plurality of flexible and resilient fingers or members 120, each with an outward end portion 122 attached to an inward circumferentially extending edge portion 124 of the insert face wall portion 116 and an inward free-end portion 126. The free-end portions 126 of the flexible and resilient members 120 define a central insert opening 128 of the insert 104.

The inward circumferentially extending edge portion 124 of the insert face wall portion 116 of the depicted implementation has a circular periphery from which the flexible and resilient members 120 extend inward transverse to the insert axis 105, in the illustrated embodiment orthogonal to the insert axis 105 and the outer insert sidewall portion 114 before the insert is installed, as will be more fully described below. The inward free-end portion 126 of the depicted implementation define a substantially circular central insert opening 128 of the insert 104, which serves as a passageway.

Figure 2A:
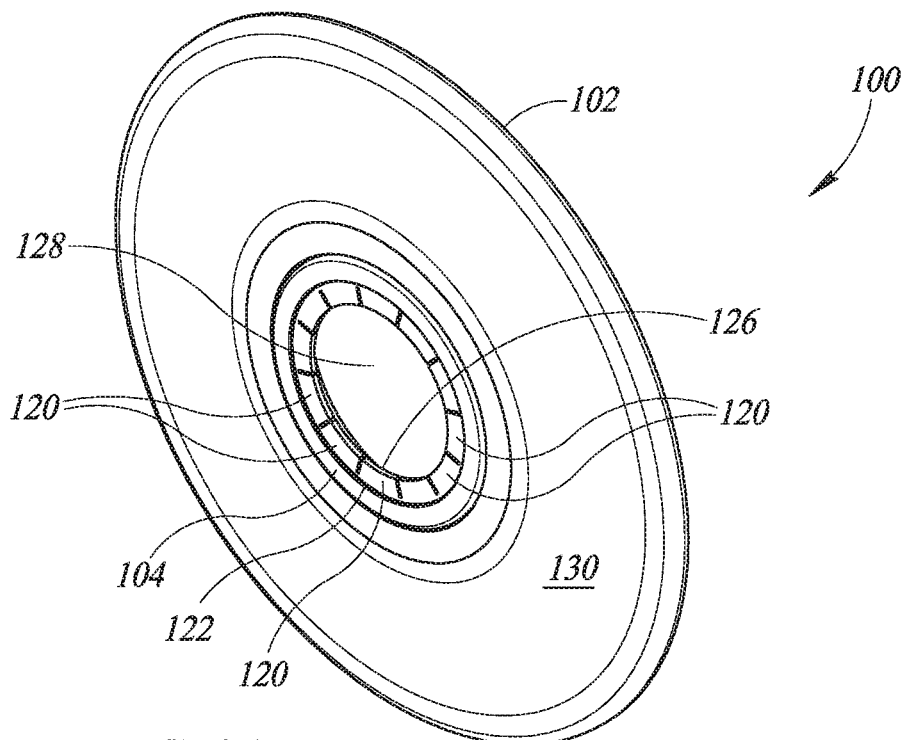
FIG. 2A is a front perspective view of the assembled escutcheon of FIG. 1A.
Figure 2B:
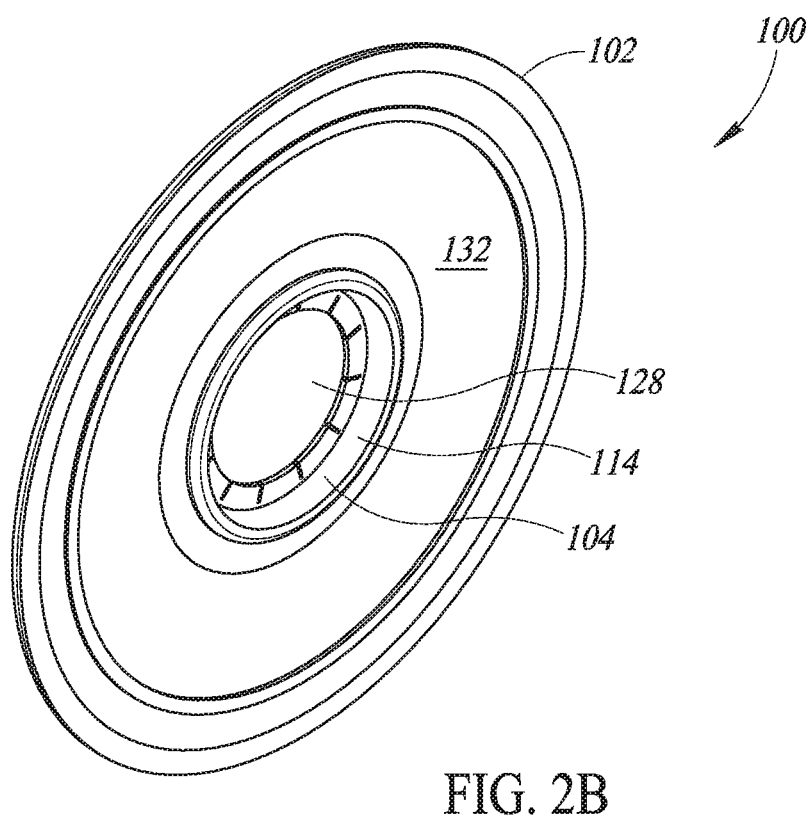
FIG. 2B is a rear perspective view of the assembled escutcheon of FIG. 1A.
Figure 3A:
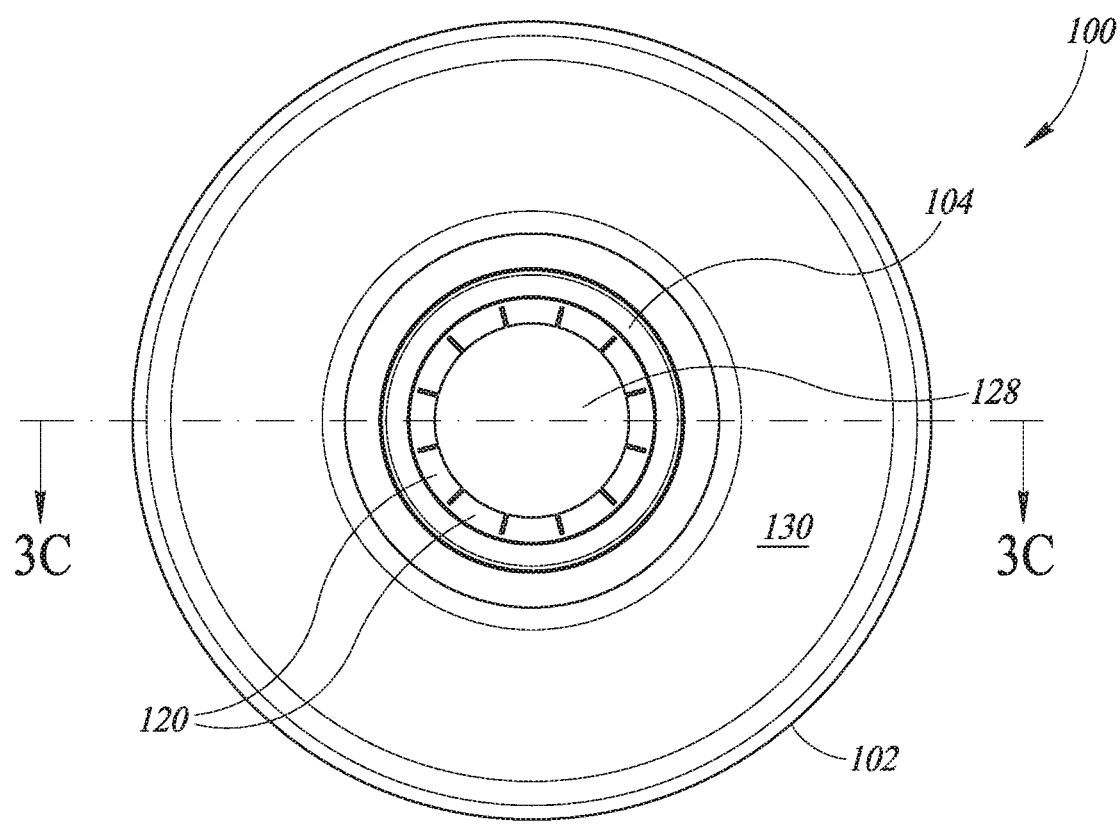
FIG. 3A is a front elevational view of the assembled escutcheon of FIG. 1A.
Figure 3B:
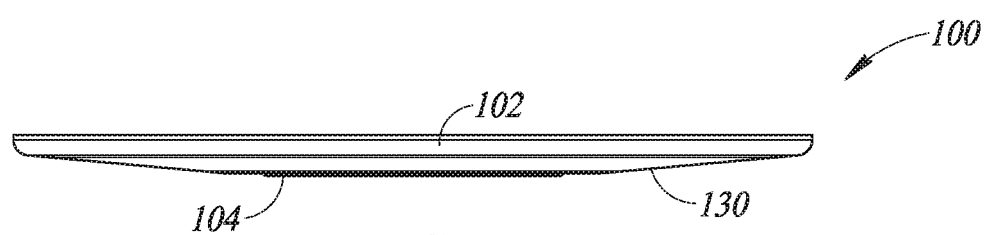
FIG. 3B is a side elevational view of the assembled escutcheon of FIG. 1A.
Figure 3C:
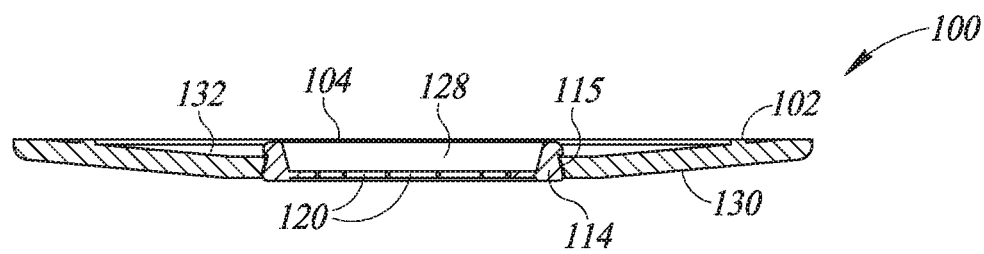
FIG. 3C is a sectional view taken substantially along the line 3C-3C of FIG. 3A.

The body 102 has a front surface 130 shown in FIGS. 1A, 2A and 3A, and a rear surface 132 shown in FIGS. 1B and 2B. The front surface 130 of the depicted body 102 has a convex surface and the rear surface 132 may be planar or more often be concave. The body 102 is shown to have a greater thickness than that of the flexible and resilient members 120.

The escutcheon 100 is intended primarily for use with a push-fit fitting, such as the push-fit valve 134 shown in FIGS. 4, 5, 7A, 8A, and 9, when replacing a compression fitting, such as a compression valve (not shown). In a typical situation involving replacement of a plumbing water-supply compression valve, the compression valve is attached to a free-end portion 136 of a water-supply pipe 138 extending outward through a hole 140 in a wall 142 (such as a bathroom wall when the valve is a for water supply to a toilet). The pipe free-end portion 136, at a location outward of the wall 142 but close to the wall, has a compression ferrule 144 affixed thereto and a compression nut 146 slidably coupled thereto. The compression ferrule 144 and the compression nut 146 are used for coupling of the compression valve to the pipe free-end portion 136. The compression nut 146 is located between the compression ferrule 144 and the wall 142. To replace the compression valve with the push-fit valve 134, the compression valve is removed but it is difficult and sometime nearly impossible, especially without a special purpose puller tool, to remove the compression ferrule 144, and if the compression ferrule is not removed, the compression nut 146 cannot be removed. Usually the compression nut may be left on the pipe and pushed back into the hole 140 in the wall 142 where it is hidden and does not interfere with installation of the push-fit valve.

Figure 9:
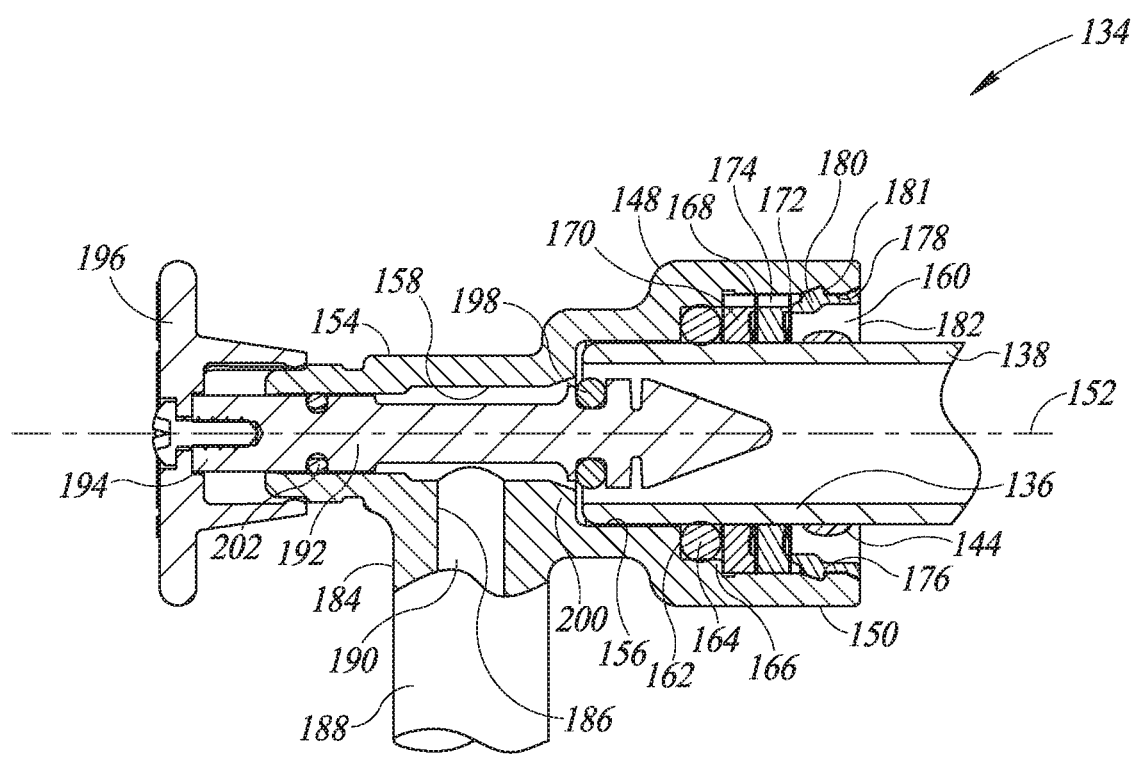
FIG. 9 is a sectional view of the valve of FIG. 4 mounted on the pipe without showing the escutcheon.

An example of the push-fit valve 134 usable with the escutcheon 100 of the present invention is illustrated as a water-supply stop valve and shown in detail in FIG. 9. The push-fit valve 134 has a housing 148 with a first housing portion 150 having a longitudinal axis 152 and a second housing portion 154 in coaxial arrangement. The first housing portion 150 has a first axial chamber or bore 156 and the second housing portion 154 has a second axial chamber or bore 158 in coaxial arrangement with the first axial bore. The inward end portion of the first axial bore 156 is in fluid communication with the inward end portion of the second axial bore 158. The outer end portions of the first axial bore 156 and the second axial bore 156 are open.

The first axial bore 156 is sized to receive therein, through an open outer end 160 of the first axial bore, the pipe free-end portion 136 of the water-supply pipe 138. The first axial bore 156 includes a shoulder 162 at which an O-ring 164 is positioned. The shoulder 162 holds the O-ring 164 against inward movement. The O-ring 164 is sized to receive the pipe free-end portion 136 therethrough and provide a fluid-tight seal between the outer wall of the pipe free-end portion and the inner wall of the first axial bore 156. Another shoulder 166 is positioned outward of the shoulder 162 and outward of the O-ring 164.

A first gripper ring 168 and a first spacer bushing 170 are positioned outward of the O-ring 164 with the first spacer bushing against the shoulder 166, which holds the first spacer bushing against inward movement. In the embodiment of push-fit valve 134 illustrated in FIG. 8, a second gripper ring 172 and a second spacer bushing 174 are positioned outward of the first gripper ring 168 and first spacer bushing 170, all being arranged in coaxial alignment. Each of the first and second gripper rings 168 and 172 has a central through-hole through which the pipe free-end portion 136 may be inserted and a plurality of circumferentially spaced, axially and radially inwardly protruding teeth that extend into the central through-hole and grip the pipe free-end portion 136 when inserted therein. The teeth grip the pipe free-end portion 136 to prevent its unintentional withdrawal during use.

Each of the first and second spacer bushings 170 and 174 has a central through-hole through which the pipe free-end portion 136 may be inserted.

The first and second gripper rings 168 and 172 may include one or more keyways to engage longitudinally extending keys on the inner wall of the first axial bore 156 to prevent rotation of the gripper ring within the first axial bore. Each of first and second spacer bushings 170 and 174 may also include one or more keyways to engage the same longitudinally extending keys on the inner wall of the first axial bore 156 to prevent rotation of the spacer bushings and hence the gripper rings within the first axial bore.

It is to be understood that the push-fit valve 134 may use more than a single O-ring and may use a single gripper ring or more than two gripper rings to achieve the desired seal with and grip on the pipe free-end portion 136. Further, the O-rings and gripper rings may be in different sequential positions within the first axial bore 156.

An annular end bushing 176 is positioned in an open end portion 178 of the first axial bore 156 and secured to the first housing portion 150 to retain the O-ring 164, the first and second gripper rings 168 and 172, and the first and second spacer bushings 170 and 174 within the first axial bore. The end bushing 176 extends inward of the axial bore 156 sufficiently that an inward circumferentially extending end portion of the end bushing engages the outer perimeter wall portion of the second gripper ring 172, to hold the gripper rings and spacer bushings tightly sandwiched together between the shoulder 166 and the inward end portion of the end bushing 176. It also limits axial movement of the O-ring 164, which is positioned between the second shoulder 162 and the first spacer bushing 170.

The end bushing 176 has a perimeter sidewall 180 defining an interior axially extending passageway 182, and an inwardly projecting, exterior circumferentially extending locking member or rib sized to fit snuggly within an interior groove 181 of the first housing portion 150 to inhibit rearward axial movement of the end bushing within the first housing portion. The passageway 182 has a sufficient size to receive therein the compression ferrule 144 without it interfering with the secure attachment of the push-fit valve 134 to pipe free-end portion 136, and preferably without it blocking movement of the open end 160 of the first axial bore 156 (i.e., the rearward end of the first housing portion 150) to a position close to the bathroom wall 142 so as to allow the escutcheon 100 to fit snuggly between the bathroom wall and the rearward end of the first housing portion when installed on the free-end portion 136 of a water-supply pipe 138, as will be described below.

A third housing portion 184 has an inward end portion 186 and an outward end portion 188, and a fluid channel 190 extending fully therethrough. The fluid channel 190 has an inward end portion in fluid communication with the second axial bore 158 of the second housing portion 154, at a midportion of the second housing portion, and an outward end channel portion terminating with an output fluid port to which a hose is connected for conducting a supply of water to a water tank of a toilet, an ice maker, a dishwasher or other plumbing fixtures or equipment. The third housing portion 184 is arranged perpendicular to the axially aligned first and second housing portions 150 and 154, but it is to be understood that other arrangements of the housing portions is possible. Further, while the first, second and third housing portions 150, 154 and 184 of the housing 148 are formed as an integral unit, it is to be understood that the housing portions may be formed as separate component temporarily or permanently connected together for use.

The push-fit valve 134 utilizes a valve element, which includes a valve stem 192 axially movable within the second housing portion 154 between a valve-opened position and a valve-closed position. The valve stem 192 extends outward of the second housing portion 154 through a second housing portion opening and has an outer end portion 194 positioned outward of the second housing portion with an actuator 196, also comprising part of the valve element, attached thereto which is grippable by a user to manually move the valve stem between the valve-opened and valve-closed positions. An inward end of the valve stem 192 is positioned within the second housing portion 154 and has a first valve stem O-ring 198 mounted thereon which acts as a stopper and is part of the valve element, at a location inward of the inward end of the fluid channel 190, for axial movement with the valve stem. When the valve stem 192 is pulled sufficiently outward by the actuator 196 into the valve-closed position, the first valve stem O-ring 198 is moved into sealingly engagement with a valve seat 200 formed on the inner wall of the second axial bore 158. A second valve stem O-ring 202 is mounted on the valve stem at a location outward of the inward end channel portion of the fluid channel 190, for axial movement with the valve stem. The second valve stem O-ring 202 provides a fluid-tight seal between the valve stem 192 and the inner wall of the second housing portion 154 when the valve stem is in the valve-opened position and the valve-closed position, and all positions therebetween to prevent escape of fluid out of the second housing portion opening at the outward end of the second axial bore 158.

When the valve stem 192 is pushed sufficiently inward by the actuator 196 into the valve-opened position, the first valve stem O-ring 198 is moved out of sealingly engagement with the valve seat 200, thereby permitting fluid communication between the inward ends of the first and second axial bores 156 and 158 of the first and second housing portions 150 and 154. This allows the flow of fluid provided by the pipe free-end portion 136 to flow to the inward end channel portion of the fluid channel 190 for exit out of the outward end channel portion through the output fluid port of the third housing portion 184.

While the push-fit valve 134 is described as having a push-pull type operation, it is to be understood that other types of opening and closing mechanisms may be utilized, such as a quarter turn style valve mechanism.

Figure 4:
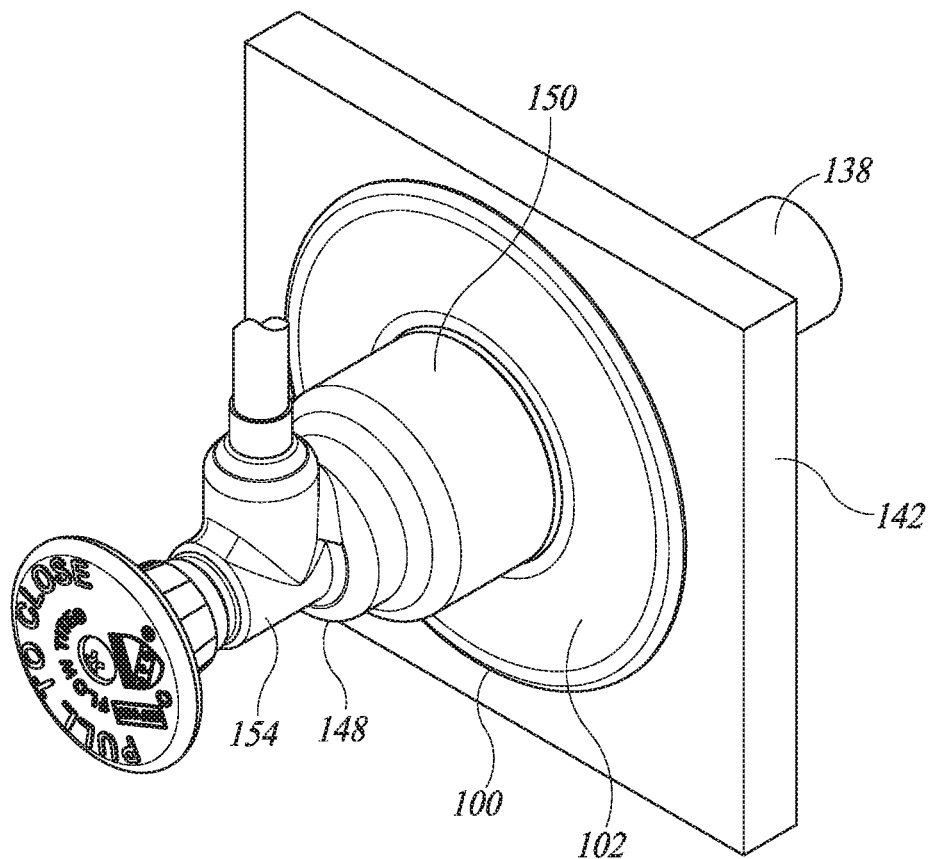
FIG. 4 is a front perspective view of the escutcheon of FIG. 1A mounted on a pipe between a valve and a wall.
Figure 5:
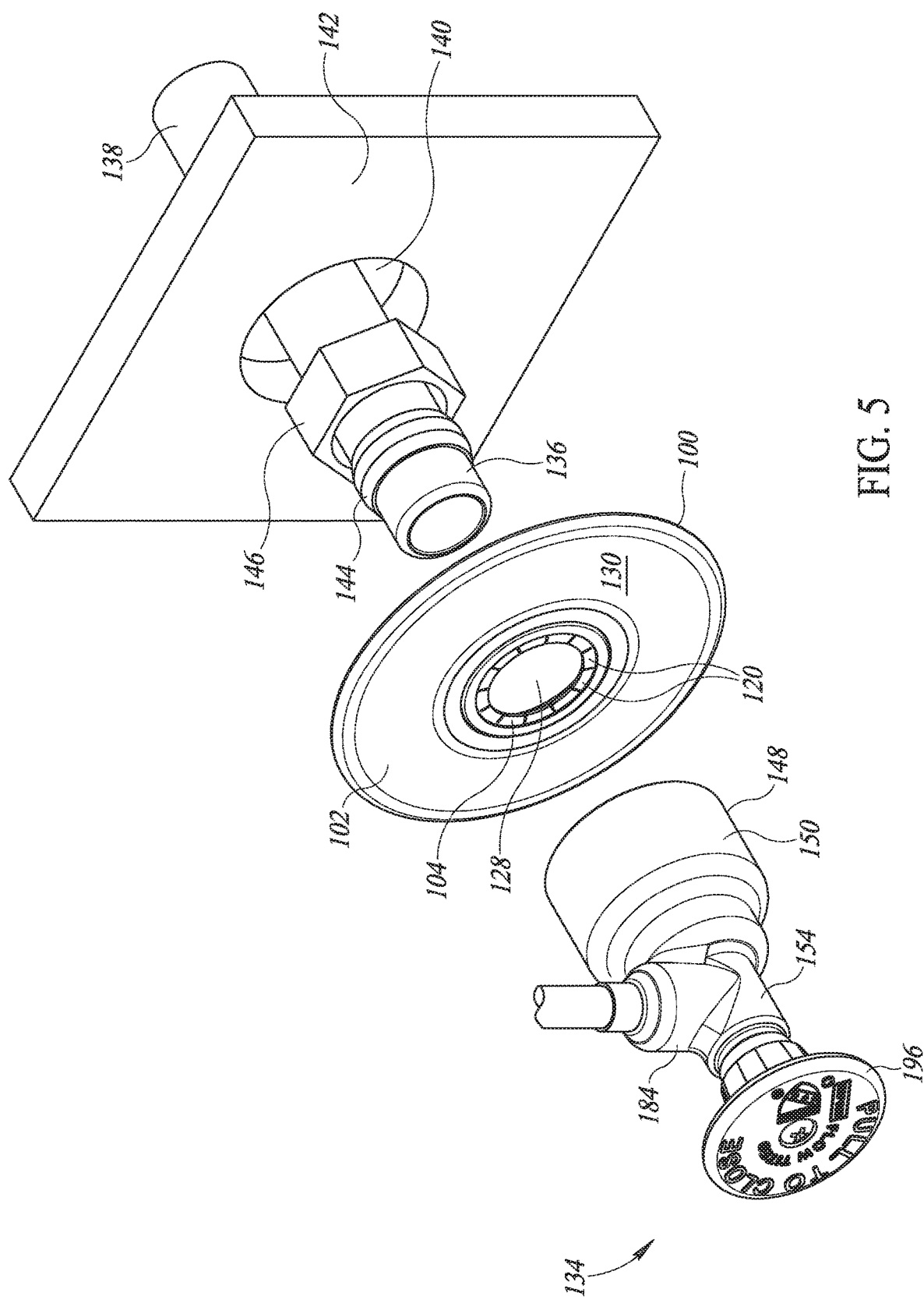
FIG. 5 is an exploded view of the escutcheon mounted on the pipe between the valve and the wall shown in FIG. 4.

An exemplary completed installation of the escutcheon 100 and the push-fit valve 134 is shown in FIG. 4. FIG. 5 shows an exploded view of the components of the completed installation. FIGS. 6A and 6B show the first step in installation of the escutcheon 100 on the pipe free-end portion 136. The escutcheon 100, with the insert 104 securely positioned within the central body opening 110, is positioned with the central insert opening 128 aligned to receive the pipe free-end portion 136 therethrough.

Figure 7A:
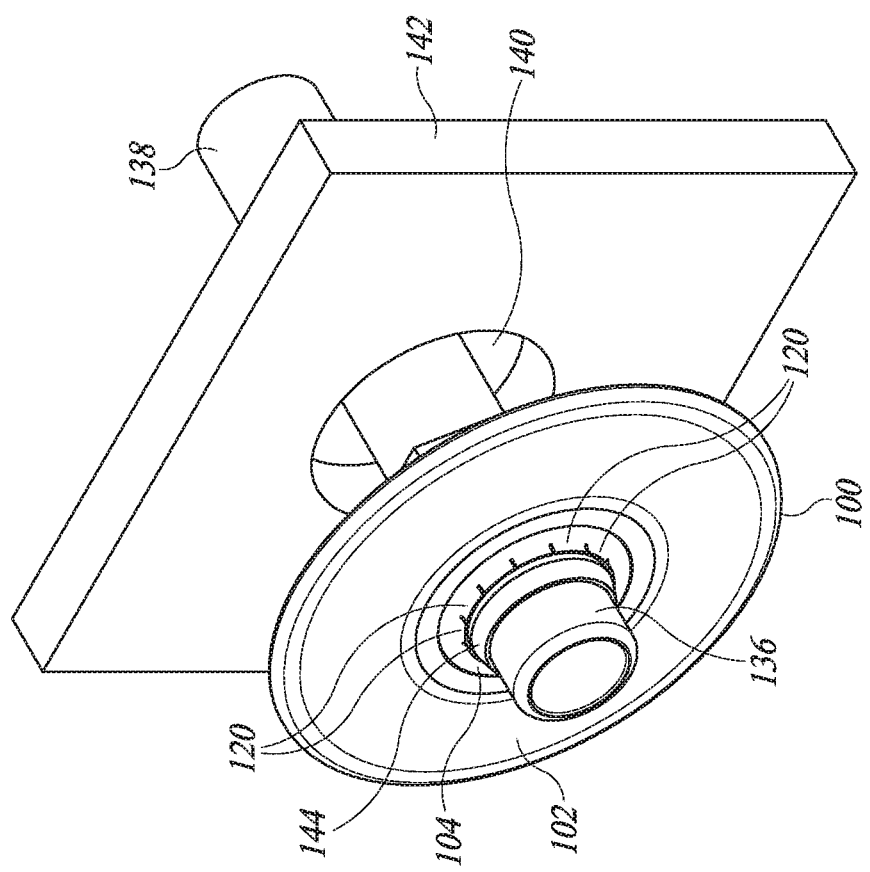
FIG. 7A is an exploded perspective view of the escutcheon mounted on the pipe for inward movement to against the wall shown in FIG. 4.

FIGS. 7A and 7B show the second step in the installation of the escutcheon 100 on the pipe free-end portion 136, which is to push the escutcheon toward the wall 142 to advance the pipe free-end portion 136 through the central insert opening 128 and pass the insert 104 over the compression ferrule 144. FIG. 7B illustrates how the flexible and resilient members 120 of the insert 104 bend backward (in the outward direction) and the central insert opening 128 is enlarged as a result as the insert moves inward to a position with the compression ferrule within the central insert opening. Before the escutcheon 100 is moved sufficiently inward on the pipe free-end portion 136 for the flexible and resilient members 120 of the insert 104 to reach and come into contact with the compression ferrule 144, the central insert opening 128 defined by the free-end portions 126 of the flexible and resilient members is preferably sized about the same as or slightly larger than the diameter of the pipe 138. It is understood that the flexible and resilient members 120 may be sized to define the central insert opening 128 somewhat smaller than the diameter of the pipe 138, thus retaining some outward bend even when the escutcheon 10 is moved inward on the pipe free-end portion 136 to a position past the compression nut 146. Prior to or as the escutcheon 100 is moved inward on the pipe free-end portion 136, the compression nut 146 is pushed inward on the pipe free-end portion until it is within the hole 140 in the wall 142 so as to move the compression nut to a position where it will not interfere with the eventual positioning of the escutcheon against the wall shown in FIGS. 8A and 8B.

Figure 8A:
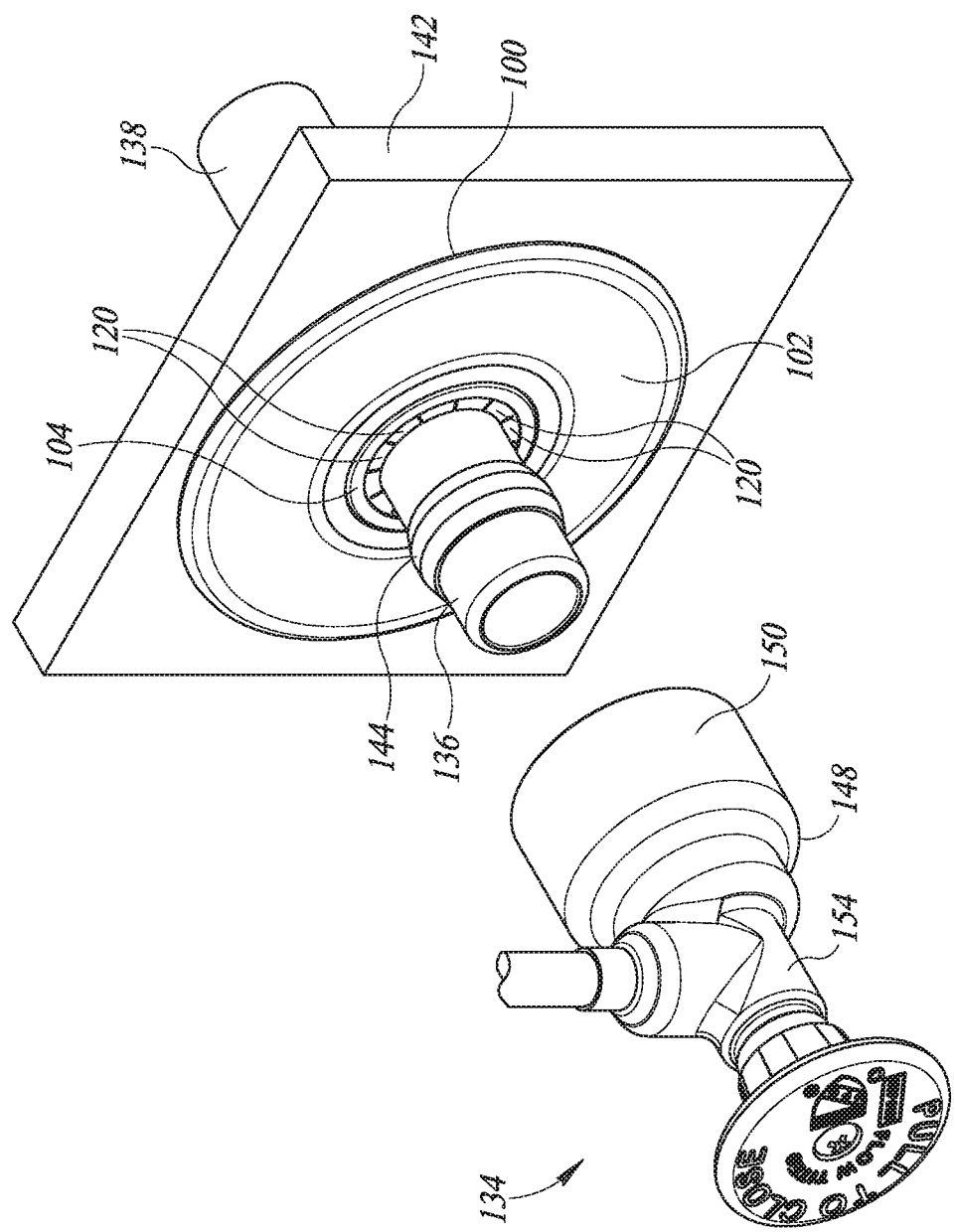
FIG. 8A is an exploded perspective view of the escutcheon mounted on the pipe against the wall with the valve positioned for mounting on the pipe shown in FIG. 4.
Figure 8B:
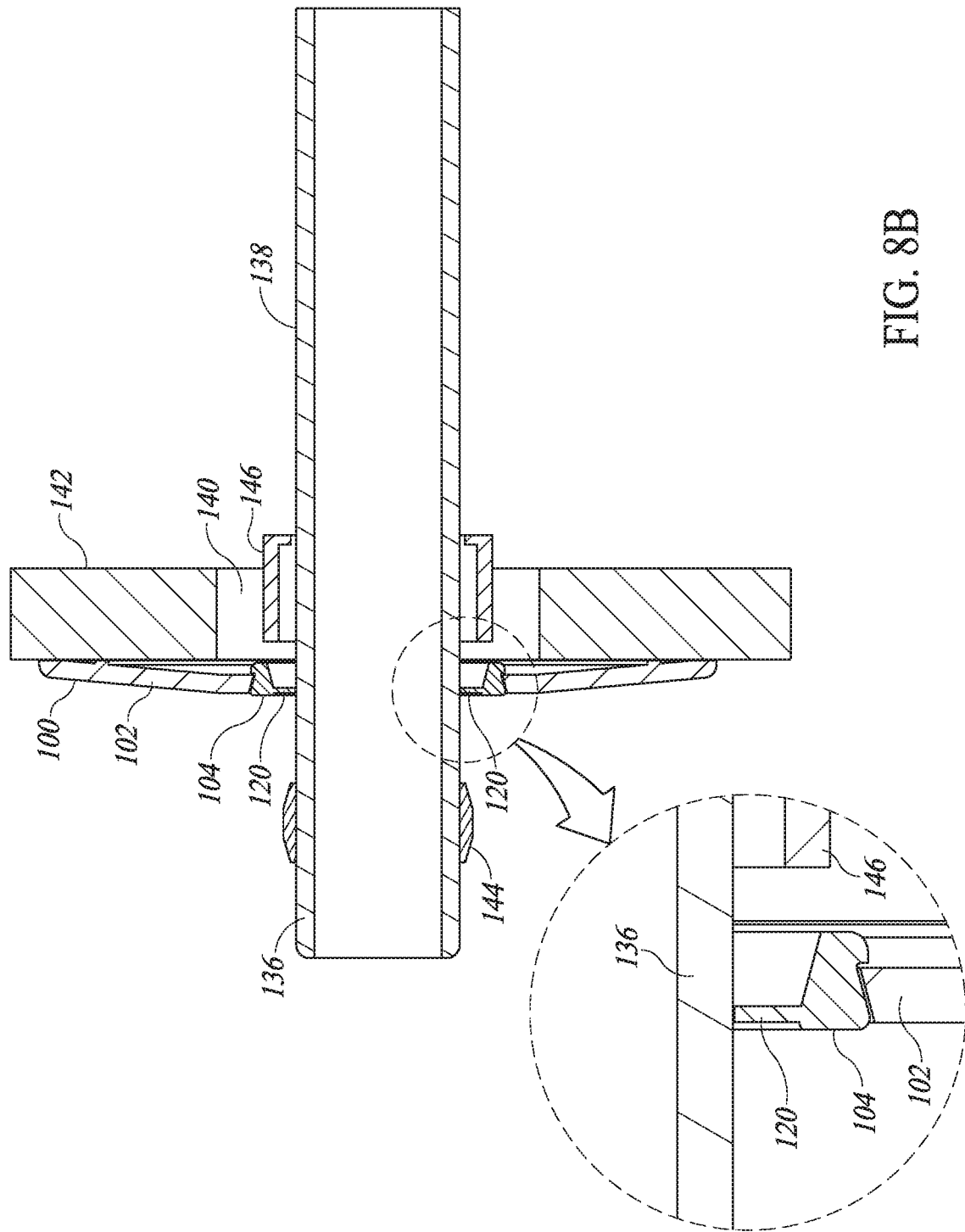
FIG. 8B is a side elevational view of the escutcheon mounted on the pipe against the wall shown in FIG. 8A with a portion of the escutcheon shown enlarged.

FIGS. 8A and 9B show the third step in the installation of the escutcheon 100 on the pipe free-end portion 136, which is to push the escutcheon further inward toward the wall 142 until the rear surface 132 of the body 102 of the escutcheon is in contact with the wall, or at least as close to the wall as possible or desired. In the illustrated embodiment, when the escutcheon 100 is in this position, the central insert opening 128 defined by the free-end portions 126 of the flexible and resilient members 120 is sized about the same as the diameter of the pipe 138. This result in the flexible and resilient members 120 leaving little or no gap between the pipe 138 and the free-end portion 126 of the flexible and resilient members, and holding the body 102 in an upright position against the wall 142.

The fourth step in the installation of the escutcheon 100 on the pipe free-end portion 136, is to align the second axial bore 158 of the push-fit valve 134 with the pipe free-end portion, and then push the push-fit valve inward until the O-ring 164 is in sealing engagement with the pipe free-end portion, the first and second gripper rings 168 and 172 grip the pipe free-end portion, and the open end 160 of the first axial bore is against the front surface 130 of the body 102 of the escutcheon, as shown in FIG. 4. In this fully installed position, the compression nut 146 is located inside of the hole 140 of the wall 142, the escutcheon 100 is against the wall so as to cover the hole 140 and hide the compression nut, and the push-fit valve 134 is secured on the pipe free-end portion 136, all without removing of the compression ferrule 144 or using any tools.

If necessary or desirable, the escutcheon 100 may be removed from the installed position by first removing the push-fit valve 134 from the pipe free-end portion 136, and then moving the escutcheon outward away from the wall 142 and back over the compression ferrule 144 until free of the pipe free-end portion. Once removed it can be re-installed by following the process described above, again all without removing the compression ferrule 144 or using any tools.

The escutcheon 100 eliminates the need to remove the compression ferrule 144 or the compression nut 146 from the pipe 138, either with a tool or by cutting off a portion of the pipe free-end portion 136, in order to install the replacement escutcheon on the pipe free-end portion adjacent to the wall 142 with a minimum gap between the insert annular portion 118 and the pipe, and to then install the replacement the push-fit valve 134 on the pipe free-end portion.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An escutcheon mountable on a pipe with a free-end portion extending outward through an aperture in a wall and having a compression ferrule fixed thereto at a location outward of an outward surface of the wall, the escutcheon being usable with a replacement valve to be connected directly to the free-end portion of the pipe after removal of another valve previously connected to the free-end portion of the pipe using the compression ferrule, comprising:

a body having an annular body wall portion with a forward face, an outer perimeter edge portion extending about the annular body wall portion, and an unthreaded inner body sidewall portion defining a central body opening, the central body opening having a uniform diameter along an axial length thereof sized larger than the outer diameter of the compression ferrule to permit the central body opening to receive the free-end portion of the pipe therein and the body to be moved inward along the free-end portion of the pipe sufficiently to pass outward of and beyond the compression ferrule to a position inward of the compression ferrule and against the outward surface of the wall, the unthreaded inner body sidewall portion defining the central body opening being sized to be spaced laterally outward of and out of contact with the pipe and out of fluid-sealing engagement with the pipe when the free-end portion of the pipe is received in the central insert opening and being out of fluid-sealing engagement with the replacement valve when the replacement valve is connected to the free-end portion of the pipe, the body having a thickness sufficiently thin to be positioned on the free-end portion of the pipe between the compression ferrule and the outward surface of the wall with a sufficient length of the free-end portion of the pipe extending outward of the body for attachment of the replacement valve thereto; and an insert having an annular insert wall portion, an outer insert sidewall portion extending about the annular insert wall portion, and an inner insert annular portion, the outer insert sidewall portion being sized to be removably snap fitted within the central body opening with the outer insert sidewall portion in face-to-face juxtaposition with the inner body sidewall portion, the inner insert annular portion comprising a plurality of flexible and resilient, inwardly extending members, each with an outward end portion attached to an inward edge portion of the annular insert wall portion and an inward free-end portion positioned inward of the annular insert wall portion, the inward free-end portions defining a central insert opening sized to grippingly receive the free-end portion of the pipe therein with the inward free-end portions bending forward in response to engagement with the free-end portion of the pipe as the escutcheon is pressed onto the free-end portion of the pipe.

2. The escutcheon of claim 1, wherein the outer insert sidewall portion has a greater axial thickness than the inner body sidewall portion.

3. The escutcheon of claim 2, wherein the outer insert sidewall portion has a greater axial thickness than the outward end portions of the flexible and resilient, inwardly extending members.

4. The escutcheon of claim 1, wherein the annular insert wall portion is rigid relative to the inwardly extending members of the inner insert annular portion.

5. The escutcheon of claim 1, wherein the annular insert wall portion and the inner insert annular portion are in coplanar arrangement prior the pipe being received in the central insert opening.

6. The escutcheon of claim 1, wherein the annular insert wall portion and the inner insert annular portion extend transverse to the outer insert sidewall portion prior the pipe being received in the central insert opening.

7. The escutcheon of claim 1, wherein the annular body wall portion and the annular insert wall portion are in coaxial arrangement about an axis when the outer insert sidewall portion is within the central body opening in face-to-face juxtaposition with the inner body sidewall portion.

8. The escutcheon of claim 7, wherein the inwardly extending members of the inner insert annular portion extend inward transverse to the axis prior the pipe being received in the central insert opening.

9. The escutcheon of claim 8, wherein the inwardly extending members of the inner insert annular portion extend inward orthogonal to the axis prior the pipe being received in the central insert opening.

10. The escutcheon of claim 1, wherein the inwardly extending members of the inner insert annular portion are distributed circumferentially about an inward edge portion of the annular insert wall portion.

11. The escutcheon of claim 1, wherein at least a lengthwise portion of the inwardly extending members of the inner insert annular portion are bent forward when the pipe is received in the central insert opening.

12. The escutcheon of claim 1, wherein the outer insert sidewall portion has a circumferentially extending, perimeter groove and the inner body sidewall portion is shaped to fit within the insert perimeter groove to securely hold the insert within the central body opening.

13. The escutcheon of claim 1, wherein the body is made of an ABS plastic and the insert is made of polyethylene.

14. The escutcheon of claim 13, wherein the forward face of the annular body wall portion has a chrome covering.

15. An escutcheon mountable on a pipe having a compression ferrule thereon, comprising:

a body having an annular body wall portion with a forward face, an outer perimeter edge portion extending about the annular body wall portion, and an inner body sidewall portion defining a body opening, the body opening being sized larger than the outer diameter of the compression ferrule to permit the body opening to receive the pipe therein and the body to be moved inward along the pipe sufficiently to pass beyond the compression ferrule to a position inward of the compression ferrule, the inner body sidewall portion defining the body opening being sized to be spaced laterally outward of and out of contact with the pipe and out of fluid-sealing engagement with the pipe when the escutcheon is installed on the pipe; and an insert having an annular insert wall portion, an outer insert sidewall portion extending about the annular insert wall portion, and an inner insert annular portion, the outer insert sidewall portion being sized to fit within the body opening with the outer insert sidewall portion, the inner insert annular portion comprising a plurality of flexible and resilient, inwardly extending members, each with an outward end portion attached to an inward edge portion of the annular insert wall portion and an inward free-end portion positioned inward of the annular insert wall portion, the inward free-end portions defining an insert opening being sized to contact the pipe and bend forward when the escutcheon is pressed onto the pipe and bend sufficiently further forward when engaging the ferrule to allow the insert to pass by the ferrule and then bend backward sufficiently to grip the pipe after the insert passes by the ferrule.

16. The escutcheon of claim 15, wherein the outer insert sidewall portion and the inner body sidewall portion are releasably connected together when the outer insert sidewall portion is within the body opening.

17. The escutcheon of claim 16, wherein the outer insert sidewall portion and the inner body sidewall portion are snap fitted together when the outer insert sidewall portion is fitted within the body opening.

18. The escutcheon of claim 15, wherein the annular insert wall portion is rigid relative to the inwardly extending members of the inner insert annular portion.

19. The escutcheon of claim 15, wherein the annular insert wall portion and the inner insert annular portion are in coplanar arrangement prior the pipe being received in the insert opening.

20. The escutcheon of claim 15, wherein the annular insert wall portion and the inner insert annular portion extend transverse to the outer insert sidewall portion prior the pipe being received in the insert opening.

21. The escutcheon of claim 15, wherein the annular body wall portion and the annular insert wall portion are in coaxial arrangement about an axis when the outer insert sidewall portion is within the body opening.

22. The escutcheon of claim 21, wherein the inwardly extending members of the inner insert annular portion extend inward transverse to the axis prior the pipe being received in the insert opening.

23. The escutcheon of claim 22, wherein the inwardly extending members of the inner insert annular portion extend inward orthogonal to the axis prior the pipe being received in the insert opening.

24. The escutcheon of claim 15, wherein the inwardly extending members of the inner insert annular portion are distributed circumferentially about an inward edge portion of the annular insert wall portion.

25. The escutcheon of claim 15, wherein at least a lengthwise portion of the inwardly extending members of the inner insert annular portion are bent forward when the pipe is received in the insert opening.

26. The escutcheon of claim 15, wherein the outer insert sidewall portion has a circumferentially extending, perimeter groove and the inner body sidewall portion is shaped to fit within the insert perimeter groove to securely hold the insert within the body opening.

27. The escutcheon of claim 15, wherein the body is made of an ABS plastic and the insert is made of polyethylene.

28. The escutcheon of claim 27, wherein the forward face of the annular body wall portion has a chrome covering.

29. An escutcheon mountable on a pipe having a compression ferrule thereon, comprising:
- a body having an annular body wall portion with a forward face, an outer perimeter edge portion extending about the annular body wall portion, and an inner body sidewall portion defining a body opening, the body opening being sized larger than the outer diameter of the compression ferrule to permit the body opening to receive the pipe therein and the body to be moved inward along the pipe sufficiently to pass beyond the compression ferrule to a position inward of the compression ferrule, the inner body sidewall portion defining the body opening being sized to be spaced laterally outward of and out of contact with the pipe and out of fluid-sealing engagement with the pipe when the escutcheon is installed on the pipe; and
- an insert having an annular insert wall portion and an outer insert sidewall portion extending about the annular insert wall portion and sized to fit within the body opening, the insert further having a plurality of flexible and resilient, inwardly extending members, each with an outward end portion attached to the annular insert wall portion and an inward free-end portion positioned inward of the annular insert wall portion, the inwardly extending members being resiliently bendable between a first position and a second position, in the first position the inward free-end portions being in gripping contact with the pipe and in the second position the inward free-end portions defining an insert opening sized to permit the insert to pass by the ferrule on the pipe as the escutcheon is pressed onto the pipe, the inward free-end portions being sufficiently resilient to return to the first position after the insert passes by the ferrule.

30. The escutcheon of claim 29, wherein the outer insert sidewall portion and the inner body sidewall portion are releasably connected together when the outer insert sidewall portion is within the body opening.

31. The escutcheon of claim 30, wherein the outer insert sidewall portion and the inner body sidewall portion are snap fitted together when the outer insert sidewall portion is fitted within the body opening.

32. The escutcheon of claim 29, wherein the insert is removably positioned within the body opening.

33. The escutcheon of claim 29, wherein the insert is fixedly connected to the body.

34. The escutcheon of claim 29, wherein the annular insert wall portion is rigid relative to the inwardly extending members of the inner insert annular portion.

35. An escutcheon mountable on a pipe extending outward through an aperture in a wall and having a compression ferrule thereon at a location outward of an outward surface of the wall, comprising:
- a disk-shaped body having an annular body wall portion with a forward face, an outer perimeter edge portion extending about the annular body wall portion, and an inner body sidewall portion defining a body opening, the body opening being sized larger than the outer diameter of the compression ferrule, the inner body sidewall portion defining the body opening being sized to be spaced laterally outward of and out of contact with the pipe and out of fluid-sealing engagement with the pipe when the escutcheon is installed on the pipe, the body having a thickness sufficiently thin to be positioned on the pipe between the compression ferrule and the outward surface of the wall; and
- an insert having an annular insert wall portion and an outer insert sidewall portion extending about the annular insert wall portion and sized to fit within the body opening, the insert further having a plurality of flexible and resilient, inwardly extending members, each with an outward end portion attached to the annular insert wall portion and an inward free-end portion positioned inward of the annular insert wall portion, the inwardly extending members being resiliently bendable between a first position and a second position, in the first position the inward free-end portions being in gripping contact with the pipe and in the second position the inward free-end portions defining an insert opening sized to permit the insert to pass by the ferrule on the pipe as the escutcheon is pressed onto the pipe, the inward free-end portions being sufficiently resilient to return to the first position after the insert passes by the ferrule.

\* \* \* \* \*